(12) United States Patent
Mueller-Schlomka et al.

(10) Patent No.: US 10,025,038 B2
(45) Date of Patent: Jul. 17, 2018

(54) OPTICAL ADAPTOR FOR MOUNTING TO A RECEPTACLE TO OPTICALLY COUPLE CONNECTORIZED OPTICAL CABLES

(71) Applicant: CORNING OPTICAL COMMUNICATIONS LLC, Hickory, NC (US)

(72) Inventors: Gordon Mueller-Schlomka, Berlin (DE); Michael Wimmer, Berlin (DE)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/666,661

(22) Filed: Aug. 2, 2017

(65) Prior Publication Data

US 2017/0357059 A1    Dec. 14, 2017

Related U.S. Application Data

(63) Continuation of application No. PCT/US2016/016686, filed on Feb. 5, 2015.

(30) Foreign Application Priority Data

Feb. 5, 2015   (EP) .................................. 15153965

(51) Int. Cl.
  *G02B 6/38*   (2006.01)
  *G02B 6/44*   (2006.01)
(52) U.S. Cl.
  CPC ......... *G02B 6/3825* (2013.01); *G02B 6/3831* (2013.01); *G02B 6/3853* (2013.01);
  (Continued)

(58) Field of Classification Search
  None
  See application file for complete search history.

(56) References Cited

U.S. PATENT DOCUMENTS 4,753,510 A * 6/1988 Sezerman ............ G02B 6/3843
                                                    385/61
4,877,303 A * 10/1989 Caldwell .................. G02B 6/32
                                                    385/55

(Continued)

FOREIGN PATENT DOCUMENTS

JP    2006258861 A    9/2006
JP    2007-148091 A * 6/2007
(Continued)

OTHER PUBLICATIONS

EP15153965 Search Report Dated Jul. 23, 2015, European Patent Office.

(Continued)

*Primary Examiner* — Mike Stahl
(74) *Attorney, Agent, or Firm* — Michael E. Carroll, Jr.

(57) ABSTRACT

An optical adaptor for mounting to a receptacle to optically couple connectorized optical cables comprises an assembly of an optical extension comprising an optical lens to provide an optical bridging path between a first and a second one of the connectorized optical cables to optically couple the first and the second connectorized optical cable. The assembly of the optical extension has a first side to optically couple the first connectorized optical cable to the optical lens and a second side to optically couple the second connectorized optical cable to the optical lens. A mounting element is configured to receive the assembly of the optical extension and to mount the optical adaptor to the receptacle.

14 Claims, 6 Drawing Sheets

(52) U.S. Cl.
CPC ......... *G02B 6/3869* (2013.01); *G02B 6/3894* (2013.01); *G02B 6/3897* (2013.01); *G02B 6/4471* (2013.01)

(56) References Cited

U.S. PATENT DOCUMENTS

| | | | |
|---|---|---|---|
| 6,471,417 B1 * | 10/2002 | Wang | G02B 6/3813 |
| | | | 385/72 |
| 6,648,520 B2 | 11/2003 | McDonald et al. | |
| 6,802,653 B2 | 10/2004 | Deane | |
| 7,356,236 B1 * | 4/2008 | Huang | G02B 6/3807 |
| | | | 385/134 |
| 8,480,310 B2 | 7/2013 | Kewitsch | |
| 8,616,781 B2 | 12/2013 | Knapp | |
| 9,229,170 B1 * | 1/2016 | Wang | G02B 6/255 |
| 9,632,269 B1 | 4/2017 | Galvan Mijangos et al. | |
| 2003/0210874 A1 | 11/2003 | Souda et al. | |
| 2005/0220423 A1 | 10/2005 | Asano | |
| 2011/0144627 A1 * | 6/2011 | Smith | A61F 9/008 |
| | | | 606/4 |
| 2014/0133804 A1 | 5/2014 | Lu et al. | |

FOREIGN PATENT DOCUMENTS

| | | |
|---|---|---|
| WO | 2003010564 A2 | 2/2003 |
| WO | 2014195218 A1 | 12/2014 |

OTHER PUBLICATIONS

International Search Report and Written Opinion PCT/US2016/016686 Dated May 9, 2016.

* cited by examiner

OPTICAL ADAPTOR FOR MOUNTING TO A RECEPTACLE TO OPTICALLY COUPLE CONNECTORIZED OPTICAL CABLES

PRIORITY APPLICATION

This application is a continuation of International Application No. PCT/US16/16686, filed on Feb. 5, 2016, which claims the benefit of priority under 35 U.S.C. § 119 of European Patent Application Serial No. 15153965.7, filed on Feb. 5, 2015, the contents of which are relied upon and incorporated herein by reference in their entireties.

TECHNICAL FIELD

The present application relates to an optical adaptor for mounting to a receptacle to optically couple connectorized cables. Connectorized cables include, for example, cables with connectors installed on them in the field, and cables with connectors installed on them in the factory being preconnectorized optical cables. Such connectorized optical cables respectively comprise at least one optical fiber which is to optically connect to each other. The disclosure further relates to an optical assembly to optically couple connectorized cables, for example, preconnectorized optical cables to each other.

BACKGROUND

Optical cables, such as fiber optic drop cables, are capable of transmitting an extremely large amount of bandwidth compared with copper cables. The development in communication networks tends to bring optical cables closer to subscribers to have access to the increased bandwidth. However, there are certain obstacles that make it challenging and/or expensive to route optical cables deeper into the communication network, i.e. closer to a subscriber.

For instance, making a suitable optical connection between optical waveguides is much more difficult than making an electrical connection between copper wires. This is because optical connections require special tools and equipment, highly trained craftsmen, along with precision components. Additionally, as the communication network pushes towards subscribers, the communication network requires more connections, which compounds the difficulties of providing optical waveguides to the premises of the subscriber.

In order to couple generic cables having a simple structure, for example copper cables, the ends of the cables may be terminated by suitable pairs of connectors such as complementarily shaped connectors. In order to ensure the coupling of light between fiber optic cables with low attenuation, the ends of the optical fibers to be coupled have to be precisely aligned.

A precise alignment of optical fibers to be connected to each other may be ensured by using a receptacle/an optical port being adjusted to receive the optical connectors respectively terminating each of the optical cables in order to guarantee a precise coupling of the optical fibers included in the optical cables. In order to couple a first and a second cable with connectors on them, for example, preconnectorized optical cable, a first optical connector terminating the first optical cable may be inserted in the receptacle at a first side of the receptacle, and a second optical connector terminating the second optical cable may be inserted in the receptacle at a second side of the receptacle.

The receptacle provides at least a mounting function for the optical connectors terminating the optical cables. The receptacle may also provide a mechanical coupling function for the optical connectors and an optical coupling function for the optical fibers of the optical cables. In order to provide the mechanical and optical coupling function the receptacle may comprise a coupling element. The coupling element is usually configured to receive the first optical connector at a first side of the coupling element and to receive the second connector at a second side of the coupling element.

The receptacle is usually adapted to the type of optical connectors to be coupled. A receptacle may, for example, be designed by a manufacturer to couple the first optical connector of a first type to the second optical connector of the same type or a second different type. The first optical connector may be a connector made by the same manufacturer which also produces the receptacle. The second optical connector may be a connector of an industrial standard. Several industrial standard connector types are available such as SC connector, ST connector and LC connector.

The precise coupling of connectorized cables such as preconnectorized optical cables will be challenging, if one of the optical connectors has to be replaced by an optical connector of another type and a subscriber do not wish to substitute the already pre-installed receptacle. Assuming that the exchanged first optical connector is an optical connector being produced by another manufacturer than the manufacturer of the primarily installed receptacle, the new first optical connector will not be compatible with the existing receptacle. If the exchanged optical connector has a different size and/or shape than the previously installed first optical connector which was used thitherto with the receptacle, the newly used first optical connector may often not even be inserted in the receptacle let alone optically coupled to the second optical connector. In this case, it is necessary to use an optical adaptor as an intermediate part between the new first optical connector, the receptacle and the second optical connector.

There is a need to provide an optical adaptor being mountable to a receptacle to optically couple connectorized optical cables such as preconnectorized optical cables which allows a precise alignment of the optical fibers of the connectorized optical cables. There is also a desire to provide an optical assembly to optically couple connectorized optical cables such as preconnectorized optical cables to ensure a precise alignment of the optical fibers of the connectorized optical cables.

SUMMARY

Disclosed are optical adaptors for mounting to a receptacle to optically couple connectorized optical cables.

According to an embodiment of an optical adaptor for mounting to a receptacle to optically couple connectorized optical cables, the optical adaptor comprises an assembly of an optical extension comprising an optical lens to provide an optical bridging path between a first and a second one of the connectorized optical cables to optically couple the first and the second connectorized optical cable, wherein the assembly of the optical extension has a first side to optically couple the first connectorized optical cable to the optical lens and a second side to optically couple the second connectorized optical cable to the optical lens. The optical adaptor further comprises a mounting element to mount the optical adaptor to the receptacle. The mounting element is configured to receive the assembly of the optical extension and to mechanically couple the first connectorized optical cable to the mounting element so that the first connectorized optical cable is optically coupled to the first side of the assembly of the optical extension.

An embodiment of an optical assembly to optically couple connectorized optical cables is specified in claim 12.

According to an embodiment of the optical assembly to optically couple connectorized optical cables, the optical assembly comprises the optical adaptor for mounting to a receptacle to optically couple a first connectorized optical cable being terminated by a first optical connector and a second connectorized optical cable being terminated by a second optical connector as specified above. The receptacle comprises a coupling element being configured to mechanically couple the second optical connector to the receptacle and to optically couple the second connectorized optical cable to the assembly of the optical extension of the optical adaptor.

DETAILED DESCRIPTION

The present application will now be described in more detail hereinafter with reference to the accompanying drawings showing different embodiments of the concepts. The concepts may, however, be embodied in many different forms and should not be construed as limited to the embodiments set forth herein; rather, these embodiments are provided so that the disclosure will fully convey the scope of the concepts to those skilled in the art. The drawings are not necessarily drawn to scale but are configured to clearly illustrate the concepts.

Figure 1:
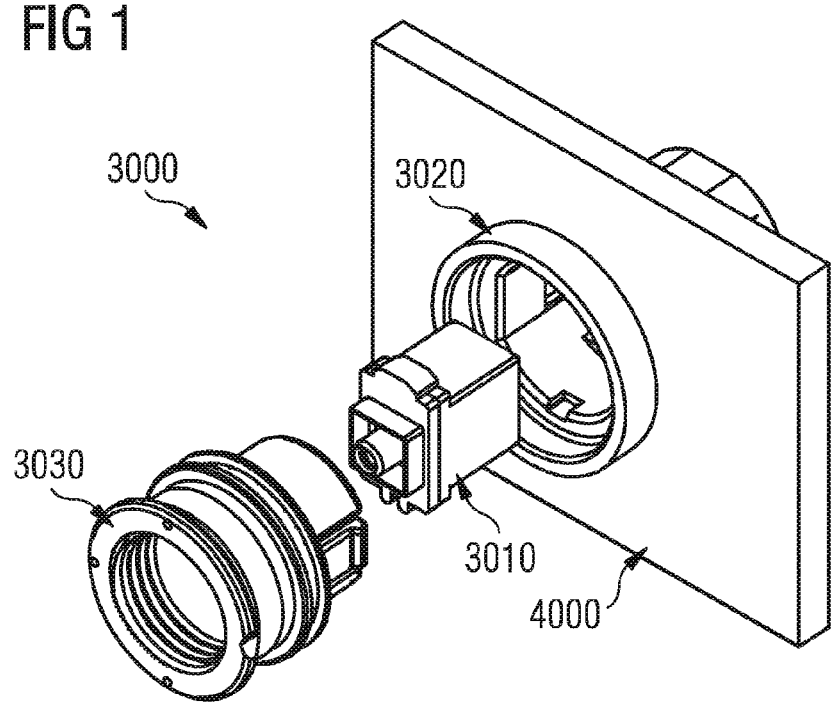
FIG. 1 is a perspective view of a receptacle to couple connectorized optical cables.

FIG. 1 shows an embodiment of a receptacle 3000 comprising a coupling element 3010 to which an optical connector terminating an optical cable, for example a fiber optic drop cable, may be connected. The receptacle 3000 comprises a fixture 3020 arranged in a bore hole of a housing 4000 such as a housing of a distribution closure. The receptacle 3000 comprises a fixation adaptor 3030 which may be mounted to the fixture 3020 by inserting the fixation adaptor into the fixture 3020. The fixation adaptor 3030 may comprise snap hooks to engage the fixation adaptor 3030 to the fixture 3020 and to securely hold the fixation adaptor 3030 inside the fixture 3020. The coupling element 3010 may be inserted and securely held in the fixation adaptor 3030. The coupling element 3010 is configured to connect a first optical connector terminating a first optical cable to a second optical connector terminating a second optical cable. The coupling element 3010 is further configured to optically couple an optical fiber of the first optical cable to an optical fiber of the second optical cable.

Figure 2:
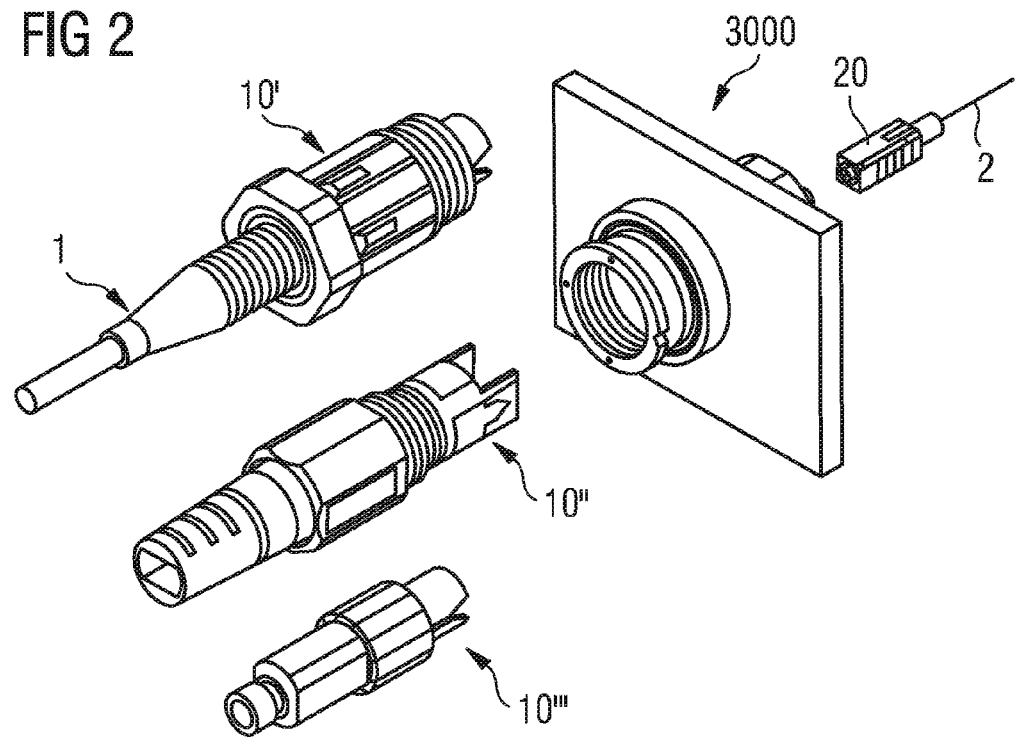
FIG. 2 shows first optical connectors of a different type to be connected to a second optical connector by a receptacle.

FIG. 2 shows connectorized optical cables such as a preconnectorized optical cable 1, for example a fiber optic drop cable, which is terminated at its end by an optical connector 10' of a first type. FIG. 2 shows other optical connectors 10" and 10''' being of a different second and third type. Another optical cable 2 is terminated at its end by optical connector 20 being of a fourth type. The optical connector 20 may be configured as a connector of a SC industrial standard type. The receptacle 3000 comprises the coupling element 3010, the fixture 3020 and the fixation adaptor 3030 as illustrated in FIG. 1. Several industrial standard connector types are available such as SC connector, ST connector or LC connector. These connectors are connected to the optical fiber to align it relative to a ferrule provided within the assembly. The front face of the connector is used to align the optical fiber. In the detailed embodiment, the assembly is described using an SC connector. Other connectors such as ST or LC connector may be used instead of an SC connector what requires adaption to the particular front face of the connector and the changes required are apparent to a skilled artisan. Cable 1 may be a cable with a connector installed on it. The connector may be installed in the factory being a preconnectorized optical cable. This disclosure and the described embodiments contemplate also connectorized cables with connectors installed on them in the field.

The receptacle 3000 is configured to optically couple the preconnectorized optical cable 1 being terminated with the optical connector 10' to the preconnectorized optical cable 2 being terminated with the optical connector 20. In particular, the optical connector 10' may be connected to the coupling element 3010 at the front side of the coupling element, and the optical connector 20 may be fixed to the coupling element 3010 at a rear side of the coupling element such that the optical fibers of the optical cable 1 and 2 are aligned to each other so that an optical attenuation of light coupled between the preconnectorized optical cables 1 and 2 is reduced.

Due to the required precise alignment of the optical fibers of the optical cables to be coupled to each other the receptacle 3000 and particularly the coupling element 3010, the fixture 3020 and the fixation adaptor 3030 of the receptacle are usually adapted to couple specific types of optical connectors to each other. The receptacle 3000 may be designed to couple the optical connector 10' of the first type to the optical connector 20 of the fourth type. However, the receptacle 3000 is not configured to couple the optical connector 20 with one of the other optical connectors 10", 10''' being of the second and third type.

In order to avoid a complete exchange of the receptacle 3000 for coupling one of the optical connectors 10" and 10''' to the optical connector 20, an optical adaptor has to be arranged between the receptacle 3000 and the respective optical connector 10", 10''' as an intermediate component to couple one of the optical connectors 10", 10''' to the optical connector 20 or to couple one of the optical connectors 10", 10''' to a first side of the optical adaptor and to couple the existing coupling element 3010 of the receptacle 3000 to a second side of the optical adaptor.

Figure 3:
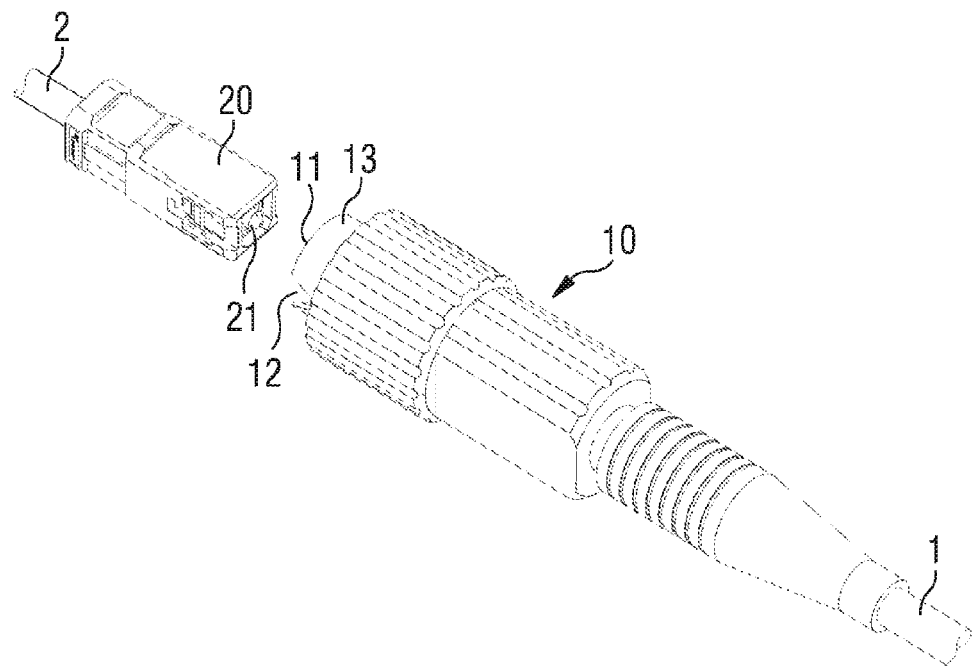
FIG. 3 shows connectorized optical cables to be connected.

FIG. 3 shows connectorized optical cables 1 and 2 to be connected. The optical cable 1 is terminated by the optical connector 10 so that the optical cable 1 is a connectorized optical cable which is a preconnectorized cable in the present embodiment. A ferrule 11 of the optical connector 10 is surrounded by a shroud 13 of the optical connector 10. The optical connector 20 may terminate the optical cable 2 so that the optical cable 2 is a connectorized optical cable and in this embodiment a preconnectorized optical cable. The respective ferrule 11 and 21 of the optical connectors 10 and 20 encapsulate a respective optical fiber of the optical cables 1 and 2. The optical connectors 10 and 20 cannot be directly be connected with each so that an optical adaptor has to be designed as a connecting part to optically couple the two connectors.

Figure 4A:
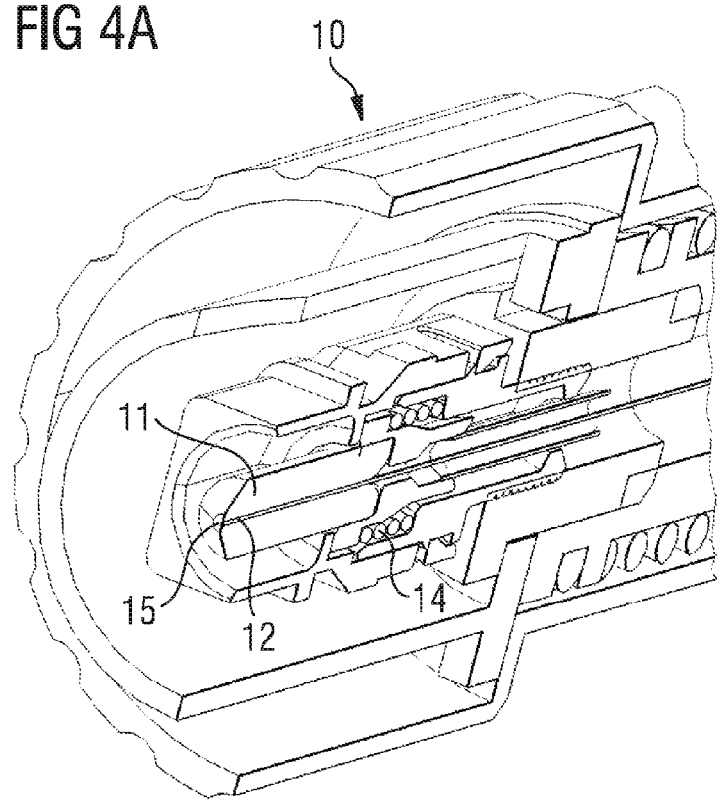
FIG. 4A shows a perspective cross-sectional view of a first optical connector.

FIG. 4A shows a perspective cross-sectional view of the optical connector 10 to terminate the optical cable 1. The optical connector 10 comprises the ferrule 11 which encapsulates an optical fiber 12 of the optical cable 1. The ferrule 11 is surrounded by the shroud 13 of the optical connector 10. Light may be coupled in/out of the optical cable 1 at a fiber end face 15 of the optical fiber 12 ending at the end face of the ferrule 11.

Figure 4B:
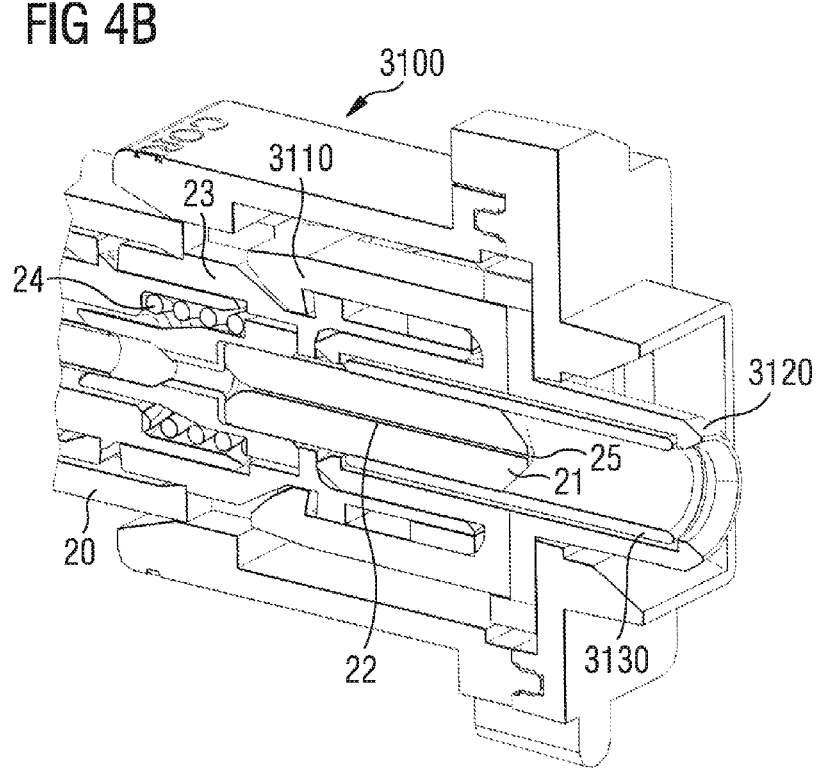
FIG. 4B shows a perspective cross-sectional view of a second optical connector inserted in a coupling element.

FIG. 4B shows a perspective cross-sectional view of the optical connector 20 to terminate the optical cable 2 and a coupling element 3100 of a receptacle. The optical connector 20 may be formed as an SC-type connector. The design of the front face of the optical connector 20 shown in FIG. 4B is typical for an SC-type connector. Other front face designs are available for ST or LC type connectors, respectively. The optical connector 20 comprises the ferrule 21 which encapsulate an optical fiber 22 of the optical cable 2. A fiber end face 25 of the optical fiber 22 ends at the end face of the ferrule 21.

The optical connector 20 is inserted and thus mechanically coupled to the coupling element 3100 of the receptacle. The coupling element 3100 is configured to be inserted and mounted to a fixture of the receptacle. The coupling element 3100 may comprise an engagement element 3110. The optical connector 10 may comprise a complementarily shaped engagement element 23 to engage in the engagement element 3110 of the coupling element 3100 to fix the optical connector 20 to the coupling element, when the optical connector 20 is inserted in the coupling element. The coupling element 3100 further comprises a tubular element 3120 to insert the ferrule 21 of the optical connector 20, when the optical connector 20 is inserted in the coupling element 3100. An inner surface of the tubular element 3120 may be lined by a sleeve 3130. The tubular element 3120 and the sleeve 3130 are configured to align the ferrule 21 of the optical connector 20, when the ferrule 21 intrudes into the tubular element 3120.

Figure 5:
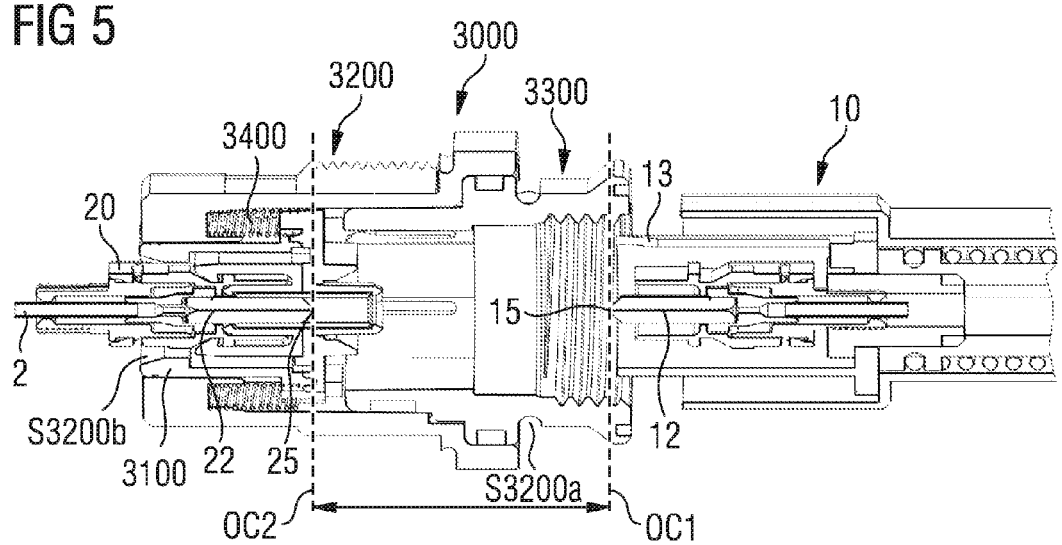
FIG. 5 shows optical connectors to be connected and a receptacle to mount the optical connectors.

FIG. 5 shows a perspective cross-sectional view of the receptacle 3000 and the to be connected optical connectors 10 and 20. The receptacle 3000 is configured to be mounted to a housing, as shown in FIG. 1, for example a housing of a distribution closure. The optical cable 2 terminated by the optical connector 20 may be arranged inside the housing and has to be connected to the optical cable 1 terminated by the optical connector 10 which may be arranged outside the housing.

The receptacle 3000 comprises a fixture 3200 formed as a hollow body to receive the coupling element 3100 of the receptacle. The coupling element 3100 is inserted in the hollow body of the fixture 3200 of the receptacle. The receptacle 3000 further comprises a fixation adaptor 3300 being configured to be fixable to the fixture 3200 of the receptacle. In order to assemble the different parts of the receptacle 3000, the coupling element 3100 is inserted from a side S3200a of the fixture 3200 into the hollow body of the fixture before the fixation adaptor 3300 is inserted in the hollow body of the fixture 3200 from the side S3200a. The receptacle 3000 further comprises at least one spring element 3400 being configured to push the coupling element 3100 in the direction towards the fixation adaptor 3300. The optical connector 20 may be inserted in the hollow body of the fixture 3200 from a side S3200b of the fixture 3200. The optical connector 20 is fixed to the coupling element 3100 by engaging in the engagement element 3110 of the coupling element.

In order to optically couple the optical connector 10 to the optical connector 20, the optical connector 10 should be inserted in the fixation adaptor 3300 so that the end of the ferrule 11 intrudes in the tubular element 3120 of the coupling element 3100 such that the fiber end face 15 of the optical fiber 12 abuts against the fiber end face 25 of the optical fiber 22. However, due to the different design of the receptacle 3000 and the optical connector 10, both parts do not fit together. In particular, the dimensions of the optical connector 10 do not allow the optical connector 10 to be inserted in the fixation adaptor 3300.

Therefore, the distance between the end face 15 of the optical fiber 12 and the end face 25 of the optical fiber 22 has to be optically bridged. The dashed line OC1 represents the plane in which a first end face of a bridging element has to be optically coupled to the ferrule 11 of the optical connector 10 to bridge a distance between the fiber end face 15 of the optical fiber 12 and the fiber end face 25 of the optical fiber 22. The dashed line OC2 represents the plane in which a second end face of the bridging element has to be coupled to the ferrule 21 of the optical connector 20 to bridge the distance between the fiber end face 25 of the optical fiber 22 and the fiber end face 15 of the optical fiber 12.

Figure 6:
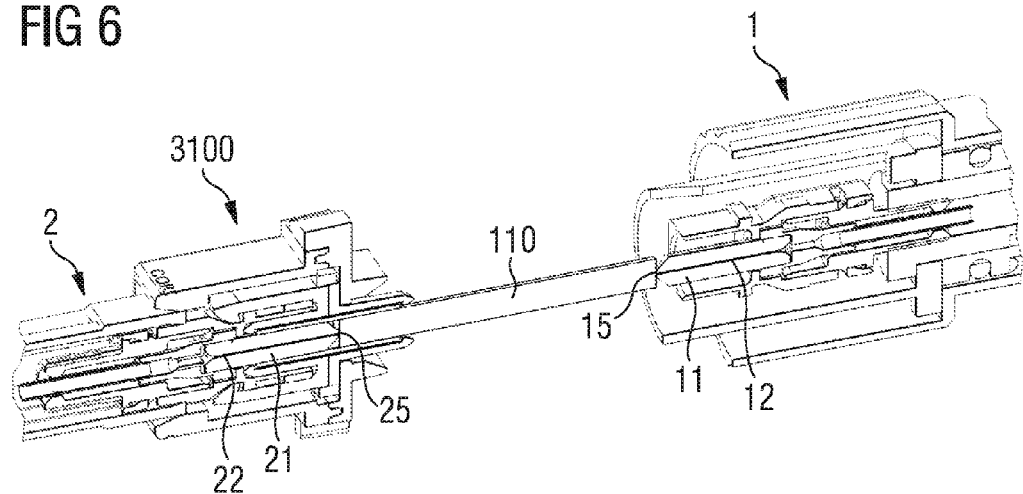
FIG. 6 shows optical connectors connected by an optical bridging path.

FIG. 6 shows the optical connector 10 and the optical connector 20 mounted to the coupling element 3100. An optical path between the fiber end face 15 of the optical fiber 12 and the fiber end face 25 of the optical fiber 22 is bridged by an optical lens 110 used as bridging element between the fiber end face 15 of the optical fiber 12 and the fiber end face 25 of the optical fiber 22. The optical lens 110 may be contained in an optical adaptor for mounting to the receptacle 3000 to optically couple the connectorized optical cables 1 and 2. According to a possible embodiment of the optical adaptor, the optical lens 110 may be configured as a GRIN (gradient index) lens.

Figure 7:
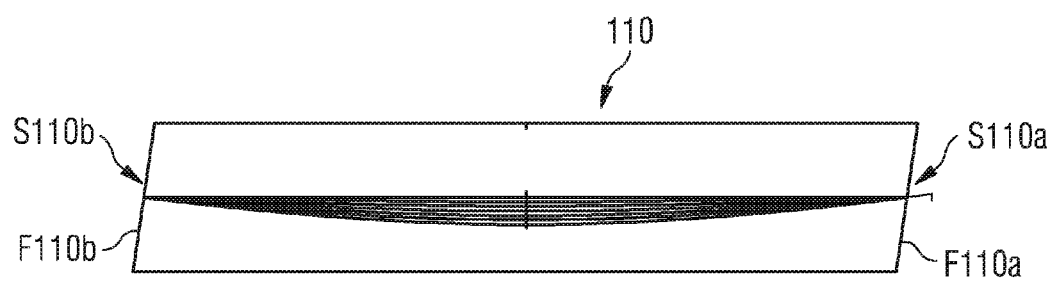
FIG. 7 shows an embodiment of an optical lens to provide an optical bridging path to optically couple connectorized optical cables.

FIG. 7 shows an embodiment of the optical lens 110 being configured as a GRIN lens with a light distribution inside the lens. The characteristics of the GRIN lens depend on the wavelength. A pitch of 1 of the GRIN lens is defined as the dimensionless "length" over which a beam of light transmitted through the lens performs a full sinusoidal path. A pitch of 0.5, for example, means that a beam of light transmitted through the lens performs a half sinusoidal path. The pitch is dimensionless. For each wavelength the pitch has a different actual length. The gradient index lens 110 is configured such that a light beam which enters the lens 110 at a side S110a of the lens in a small point-shaped area is extended to a maximum diameter at a length of 0.25 of the pitch of the lens. The expansion of the light distribution is then decreased in the direction towards an opposite side S110*b* of the lens and is again focussed on a small point-shaped area after a subsequent length of a pitch of 0.25 of the lens.

As illustrated in FIG. 7, a GRIN lens having a pitch of 0.5 allows to focus a light beam entering the lens 110 at the side S110*a* at a small area to a small area at the side S110*b* after extending the light distribution to a maximum in the middle of the optical lens. For single optical fibers to be connected, the length of the GRIN lens 110 may be selected in steps of the pitch of 0.5. Every 0.5 pitch the light beam is turned by the GRIN lens. Thus, according to a possible embodiment, the GRIN lens 110 has a length of an integral multiple of a pitch of 0.5.

In order to prevent that light coupled out of the optical fiber 12 and optically coupled in the GRIN lens 110 is reflected back in the optical fiber 12, an end face F110*a* of the optical lens 110 which is configured to be optically coupled to the ferrule 11 is slanted by an angle, for example an angle between 8° and 9°, in relation to a longitudinal axis of the lens 110. Furthermore, an end face F110*b* at the side S110*b* of the GRIN lens 110 is slanted by an angle, such as an angle between 8° and 9°, in relation to the longitudinal axis of the lens 110 in order to prevent any light reflection in the optical fiber 22.

Figure 8A:
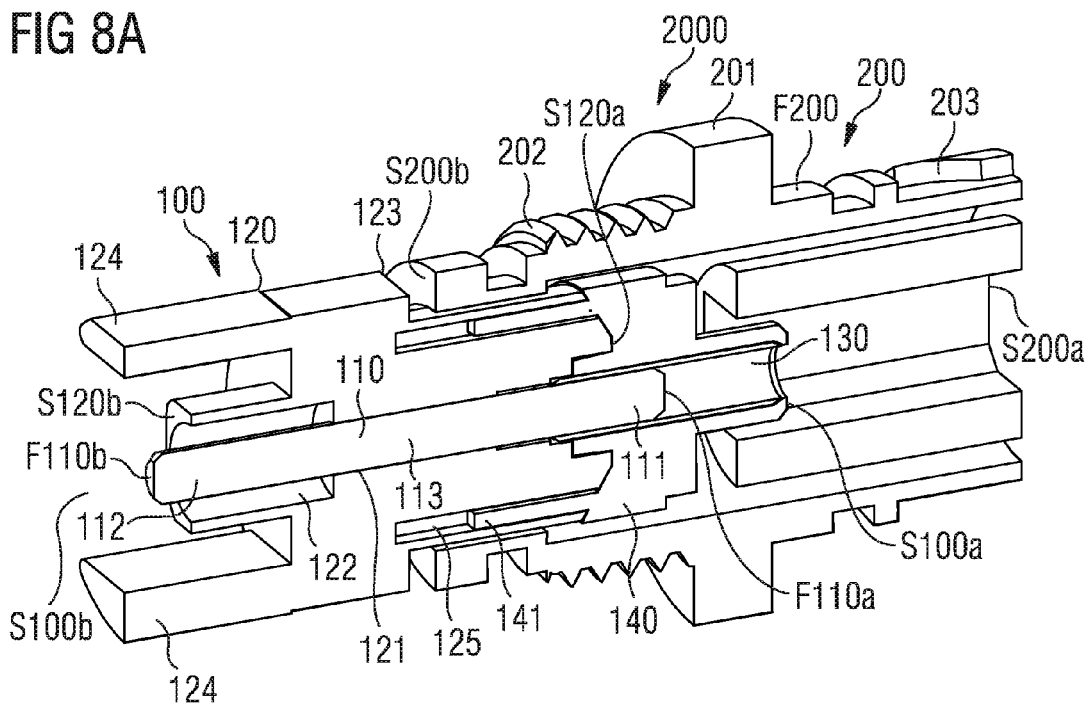
FIG. 8A shows a first embodiment of an optical adaptor for mounting to a receptacle to optically couple connectorized optical cables.

FIG. 8A shows an embodiment of an optical adaptor 2000 for mounting to the receptacle 3000 to optically couple the connectorized optical cables 1 and 2. The optical adaptor 2000 comprises an assembly of an optical extension 100 to provide an optical path between the optical connectors 10 and 20. The assembly of the optical extension 100 comprises the optical lens 110 to provide an optical bridging path between the connectorized optical cables 1 and 2, i.e. the end faces 15, 25 of the optical fibers 12, 22 to optically couple the connectorized optical cables 1 and 2. The assembly of the optical extension 100 has a side S100*a* to optically couple the connectorized optical cable 1 or the optical connector 10 terminating the optical cable 1 to the optical adaptor 2000 and a side S100*b* to optically couple the connectorized optical cable 2 or the optical connector 20 of the optical cable 2 to the optical lens 110. The side S100*b* of the optical adaptor may be configured such that the coupling element 3100 may be mounted to side S100*b* of the optical adaptor. According to another embodiment of the optical adaptor the side S100*b* may be configured to be directly moutable to the optical connector 20. According to this embodiment the functioning of the coupling element 3100 is integrated to the optical adaptor.

The lens 110 of the assembly of the optical extension 100 may be configured as a gradient index (GRIN) lens, as shown in detail in FIG. 7, having a length of an integral multiple of a pitch of 0.5 of the lens. The end face F110*a* of the GRIN lens is configured to be optically coupled to the ferrule 11 of the optical connector 10. The end face F110*b* of the lens 110 is configured to be optically coupled to the ferrule 21 of the optical connector 20. Each of the end faces F110*a*, F110*b* are slanted by an appropriate angle to prevent reflection of light back into the optical fibers 12, 22 of the optical connectors 10, 20. As shown in FIG. 7, the end faces F110*a*, F110*b* may be slanted by an angle between 8° and 9° in relation to the longitudinal axis of the lens 110.

The assembly of the optical extension 100 may comprise a connector interface 120 having a tubular hollow area 121 to receive a middle portion 113 of the lens 110. The lens 110 is arranged in the hollow area 121 of the connector interface 120 such that an end portion 111 of the lens 110 protrudes at a side S120*a* of the optical interface from the hollow area 121 of the connector interface 120. The connector interface 120 has another hollow area 122 to receive the end portion 112 of the lens 110. The hollow area 122 of the optical interface 120 has a larger diameter than the hollow area 121.

The assembly of the optical extension 100 further comprises a sleeve 130 and a sleeve holder 140 to hold the sleeve 130. The sleeve 130 is configured to receive the end portion 111 of the lens 110. The sleeve holder 140 is arranged at the side S120*a* of the connector interface 120 and is lined with the sleeve 130.

The connector interface 120 may comprise at least one alignment element 124 to direct the insertion of the connector interface 120 to the receptacle 3000. The at least one alignment element 124 of the connector interface 120 is configured to inhibit any excess rotation of the connector interface 120 in the receptacle 3000. The at least one alignment element 124 may be formed as at least one finger protruding from a body of the connector interface 120. The fixation adaptor 3300 may comprise a complementarily formed alignment element which enables, together with the at least one alignment element 124 of the connector interface 120, that the assembly of the optical extension 100 can only be inserted in a predefined direction into the hollow body of the fixation adaptor 3300.

The connector interface 120 may comprise an alignment element 125 which may be embodied as a cavity arranged at the side S120*a* of the connector interface, as shown in FIG. 8A. The sleeve holder 140 may comprise a complementarily shaped alignment element 141 which may be embodied as a stay penetrating in the cavity 125 to direct the connection between the connector interface 120 and the sleeve holder 140. The different parts of the assembly of the optical extension 100 may be pressed or glued together so that the lens 110, the connector interface 120, the sleeve 130 and the sleeve holder 140 cannot be dismantled.

The lens 110 is designed to fit into the sleeve 130 with high accuracy of the outer diameter. The lens may be placed, for example by pressing or gluing, in the right orientation in respect to coding elements of the assembly of the optical extension. One of the advantages of the assembly of the optical extension 100 is the simple manufacturing. The lens 110 is a solid part which only needs to be assembled, instead of gluing a fiber into ferrules and applying a polishing process to the end faces of the fiber. The accuracy of the outer diameter is essential for aligning both connector end faces to each other.

The optical adaptor 2000 comprises a mounting element 200 to mount the optical adaptor 2000 to the receptacle 3000. The mounting element 200 is configured to receive the assembly of the optical extension 100 and to mechanically couple the connectorized optical cable 1 and the optical connector 10 to the mounting element 200 so that the optical connector 10 or the connectorized optical cable 1 is optically coupled to the side S100*a* of the assembly of the optical extension 100. The mounting element 200 may comprise a securing means 203 to mount the optical connector 10 to the mounting element 200.

The mounting element 200 is formed as a hollow body having a side S200*a* with an opening to receive the optical connector 10 in the hollow body. The hollow body of the mounting element 200 has another side S200*b* with an opening to receive the assembly of the optical extension 100. The connector interface 120 has a shoulder 123. The connector interface 120 and the mounting element 200 are configured so that the assembly of the optical extension 100 is insertable in the opening of the hollow body at the side S200*b* of the mounting element 200 until the shoulder 123 of the connector interface 120 impacts to the mounting element 200 at the side S200b of the mounting element 200.

Figure 8B:
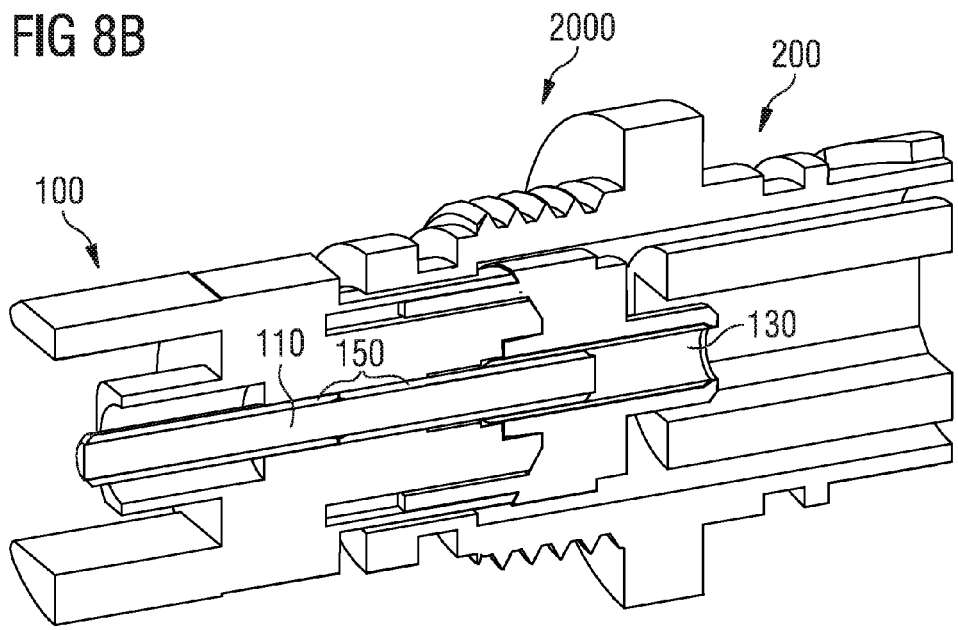
FIG. 8B shows a second embodiment of an optical adaptor for mounting to a receptacle to optically couple connectorized optical cables.

FIG. 8B shows a perspective view of another embodiment of the optical adaptor 2000 for mounting to the receptacle 3000 to optically couple the connectorized optical cables 1 and 2. In comparison to the embodiment of the optical adaptor shown in FIG. 8A, the optical adaptor illustrated in FIG. 8B additionally comprises at least one ferrule 150 encapsulating the lens 110. The lens 110 may be glued into the at least one ferrule 150. The lens 110 may be embodied as a GRIN lens as described with reference to FIG. 7.

At least a portion of the at least one ferrule 150 is arranged in the hollow area 121 of the connector interface 120. In order to optically couple the fiber end faces 15 and 25 so that light is transferred between the optical cables 1 and 2 with low loss, the ferrule 11 of the optical connector 10 and the ferrule 21 of the optical connector 20 have to be exactly aligned to the end faces F110a, F110b of the optical lens 110. To ensure the precise alignment the at least one ferrule 150, having a precise outer diameter, is used in the embodiment shown in FIG. 8B.

Figure 9A:
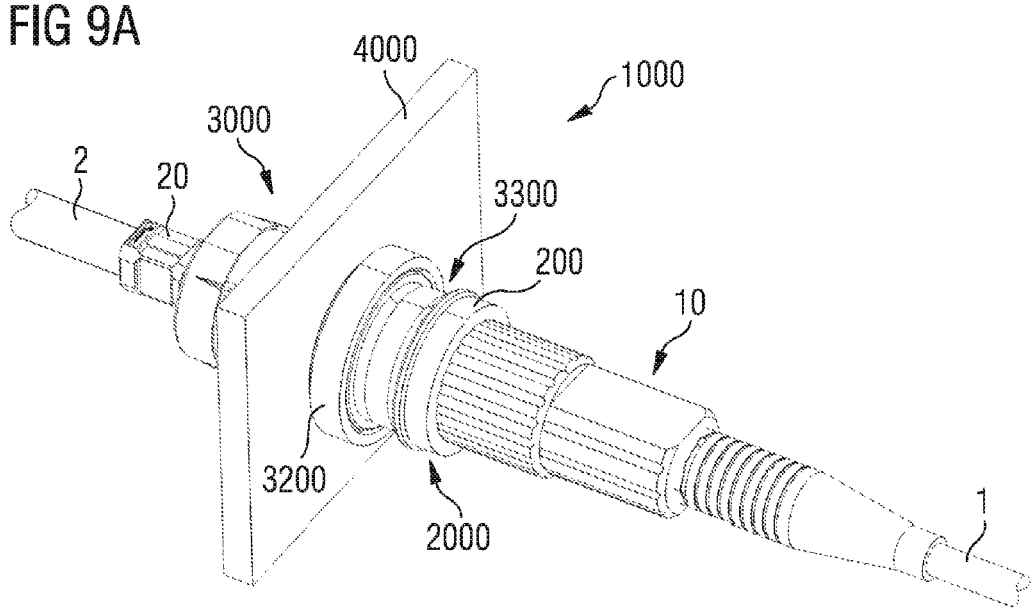
FIG. 9A shows a perspective view of an optical assembly to optically couple connectorized optical cables.

FIG. 9A shows a perspective view of an optical assembly 1000 to optically couple the connectorized optical cables 1 and 2. The optical assembly 1000 comprises the receptacle 3000 mounted to the housing 4000 and the optical adaptor 2000. The receptacle 3000 is configured to receive the optical adaptor 2000. The optical adaptor 2000 is configured to be mountable to the receptacle 3000. In the mated condition, the fixation adapter 3300 protrudes from the fixture 3200. The optical adaptor 2000 is disposed within the receptacle so that only the mounting element 200 protrudes from the fixation adaptor 3300. The optical connectors 10 and 20 terminating the optical cables 1 and 2 are mechanically coupled to the optical adaptor 2000.

Figure 9B:
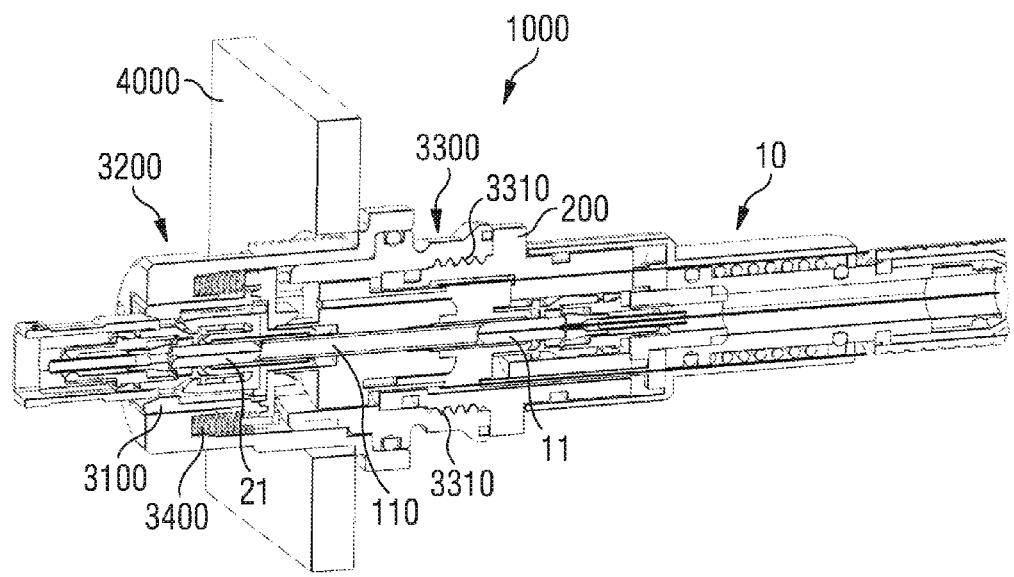
FIG. 9B shows a cross-sectional view of an optical assembly to optically couple connectorized optical cables.

FIG. 9B shows an optical assembly 1000 to optically couple the connectorized optical cables 1 and 2 in a perspective cross-sectional view. The optical assembly 1000 comprises an optical adaptor 2000 for mounting to the receptacle 3000 to optically couple the connectorized optical cable 1 being terminated by the optical connector 10 and the connectorized optical cable 2 being terminated by the optical connector 20. The receptacle 3000 is mounted to the housing 4000, for example a distribution closure. The fixation adaptor 3300 is fixed to the fixture 3200 of the receptacle, and the mounting element 200 of the optical adaptor 2000 is mounted to the fixation adaptor 3300.

According to a possible embodiment of the optical assembly the receptacle 3000 comprises the coupling element 3100, as shown in FIG. 5. The optical connector 20 is mechanically coupled to the coupling element 3100 of the receptacle to optically couple the connectorized optical cable 2 to the assembly of the optical extension 100 of the optical adaptor 2000. The coupling element 3100 is disposed within the hollow body of the fixture 3200 of the receptacle. The receptacle 3000 comprises the at least one spring element 3400 being configured to push the coupling element 3100 to the assembly of the optical extension 100 so that the tubular element 3120 of the coupling element 3100 is inserted in the hollow area 122 of the connector interface 120 and the ferrule 21 of the optical connector 20 is optically coupled to the end portion 112 of the lens 110.

According to another possible embodiment of the optical assembly the coupling element may be part of the optical adaptor 100 or the functioning of the coupling element may be integrated to the optical adaptor. According to this embodiment the optical adaptor is configured to be mountable to the optical connector 20.

Referring to FIGS. 8A and 8B, a section of an outer surface F200 of the mounting element 200 is formed as a shoulder 201 located between the side S200a and the side S200b of the mounting element 200. A portion of the outer surface F200 of the mounting element 200 is formed as a thread 202 located between the side S200b of the mounting element 200 and the shoulder 201 of the mounting element. The thread 202 is configured to screw the mounting element 200 into the receptacle 3000 such that the side S200a of the mounting element 200 protrudes from the receptacle 3000. The fixation adaptor 3300, which is formed as a hollow tube, comprises an inner thread 3310. The thread 202 of the outer surface F200 of the mounting element 200 of the optical adaptor 2000 and the inner thread 3310 of the fixation adaptor 3300 are configured to screw the mounting element 200 to the fixation adaptor 3300.

As shown in FIG. 5 and FIG. 9B, each of the optical connectors 10, 20 comprises a spring element 14, 24. In the mounted configuration of the optical assembly shown in FIG. 9B, the spring elements 14, 24 enables that the end faces 15, 25 are pressed against the end faces F110a, F110b of the lens 110.

We claim:

1. An optical adaptor for mounting to a receptacle to optically couple connectorized optical cables, the optical adaptor comprising:
    an assembly of an optical extension comprising:
        an optical lens to provide an optical bridging path between a first and a second one of the connectorized optical cables to optically couple the first and the second connectorized optical cable, wherein the assembly of the optical extension has a first side to optically couple the first connectorized optical cable to the optical lens and a second side to optically couple the second connectorized optical cable to the optical lens; and
        a connector interface having a first hollow area to receive a middle portion of the lens, wherein:
            the lens is arranged in the first hollow area of the connector interface such that a first end portion of the lens protrudes at a first side of the connector interface from the first hollow area of the connector interface; and
            the connector interface has a second hollow area to receive a second end portion of the lens, the second hollow area having a larger diameter than the first hollow area;
    a mounting element to mount the assembly of the optical extension to the receptacle; and
    wherein the mounting element is configured to receive the assembly of the optical extension and to mechanically couple the first connectorized optical cable to the mounting element so that the first connectorized optical cable is optically coupled to the first side of the assembly of the optical extension.

2. The optical adaptor of claim 1, wherein the lens of the assembly of the optical extension is configured as a gradient index lens.

3. The optical adaptor of claim 2, wherein the lens has a length of an integral multiple of a pitch of 0.5 of the lens.

4. The optical adaptor of claim 1, wherein the lens has a first end face being configured to be optically coupled to a ferrule of the first connectorized optical cable and a second end face being configured to be optically coupled to a ferrule of the second connectorized optical cable, each of the first and the second end face being slanted by an angle between 8° and 9° in relation to a longitudinal axis of the lens.

5. The optical adaptor of claim 1,
wherein the connector interface comprises at least one alignment element to direct the insertion of the connector interface to the receptacle, and
wherein the at least one alignment element of the connector interface is configured to inhibit any excess rotation of the connector interface in the receptacle.

6. The optical adaptor of claim 1,
wherein the assembly of the optical extension further comprises a sleeve and a sleeve holder to hold the sleeve,
wherein the sleeve is configured to receive the first end portion of the lens, and
wherein the sleeve holder is arranged at the first side of the connector interface.

7. The optical adaptor of claim 1, further comprising:
a ferrule encapsulating the lens,
wherein at least a portion of the ferrule is arranged in the first hollow area of the connector interface.

8. The optical adaptor of claim 1,
wherein the mounting element is formed as a hollow body having a first side with an opening to receive the first connectorized optical cable in the hollow body and having a second side with an opening to receive the assembly of the optical extension,
wherein the connector interface has a shoulder, and
wherein the connector interface and the mounting element are configured so that the assembly of the optical extension is insertable in the opening of the hollow body at the second side of the mounting element until the shoulder impacts to the mounting element at the second side of the mounting element.

9. The optical adaptor of claim 8,
wherein a section of an outer surface of the mounting element is formed as a shoulder located between the first side and the second side of the mounting element,
wherein the outer surface of the mounting element is formed as a thread located between the second side of the mounting element and the shoulder of the mounting element,
wherein the thread is configured to screw the mounting element into the receptacle such that the first side of the mounting element protrudes from the receptacle.

10. The optical adaptor of claim 1,
wherein the mounting element comprises a securing member positioned on an outer surface of the mounting element to mount the first connectorized optical cable to the mounting element.

11. An optical assembly to optically couple connectorized optical cables, comprising:
an optical adaptor for mounting to a receptacle to optically couple a first connectorized optical cable being terminated by a first optical connector and a second connectorized optical cable being terminated by a second optical connector of claim 1,
the receptacle to receive the optical adaptor,
wherein the optical adaptor is configured to be mountable to the receptacle.

12. The optical assembly of claim 11,
wherein the receptacle comprises a coupling element being configured to mechanically couple the second optical connector to the receptacle and to optically couple the second connectorized optical cable to the assembly of the optical extension of the optical adaptor,
wherein the receptacle comprises a fixture formed as a hollow body to receive the coupling element of the receptacle,
wherein the receptacle comprises at least one spring element being configured to push the coupling element of the receptacle to the connector interface of the optical adaptor so that a front portion of the coupling element is inserted in the second hollow area of the connector interface and a ferrule of the second optical connector is optically coupled to the second end portion of the lens.

13. The optical assembly of claim 12,
wherein the receptacle comprises a fixation adaptor being configured to be fixable to the fixture of the receptacle,
wherein the mounting element of the optical adaptor is mountable to the fixation adaptor.

14. The optical assembly of claim 13,
wherein the fixation adaptor is formed as a hollow tube comprising an inner thread,
wherein a thread on the outer surface of the mounting element of the optical adaptor and the inner thread of the fixation adaptor are configured to screw the mounting element to the fixation adaptor.

\* \* \* \* \*